(12) United States Patent
Austin et al.

(10) Patent No.: US 7,626,935 B2
(45) Date of Patent: Dec. 1, 2009

(54) DATA BUS WITH CLIENT-ABORTED MESSAGE HANDLING METHOD

(75) Inventors: Steven E. Austin, Penn Valley, CA (US); Dale F. Stolitzka, Los Altos, CA (US)

(73) Assignee: Analog Devices, Inc., Norwood, MA (US)

( * ) Notice: Subject to any disclaimer, the term of this patent is extended or adjusted under 35 U.S.C. 154(b) by 799 days.

(21) Appl. No.: 11/253,088

(22) Filed: Oct. 17, 2005

(65) Prior Publication Data

US 2006/0245427 A1 Nov. 2, 2006

Related U.S. Application Data

(60) Provisional application No. 60/677,292, filed on May 2, 2005.

(51) Int. Cl.
*G01R 31/08* (2006.01)
(52) U.S. Cl. ...................................... 370/236; 370/252
(58) Field of Classification Search ................ None
See application file for complete search history.

(56) References Cited

U.S. PATENT DOCUMENTS

| | | | | |
|---|---|---|---|---|
| 3,683,202 A | * | 8/1972 | Schmidt, Jr. ................. | 326/54 |
| 4,918,690 A | * | 4/1990 | Markkula et al. ........... | 370/400 |
| 6,263,420 B1 | * | 7/2001 | Tan et al. ...................... | 712/42 |
| 6,327,688 B1 | * | 12/2001 | Stolitzka et al. ............. | 714/750 |
| 6,539,443 B1 | * | 3/2003 | Dunstan et al. ............. | 710/106 |
| 6,717,941 B1 | * | 4/2004 | Dwork ........................ | 370/381 |
| 6,871,312 B2 | * | 3/2005 | Hatley ........................ | 714/752 |

FOREIGN PATENT DOCUMENTS

| EP | 1195955 A2 | 4/2002 |
|---|---|---|
| TW | 480405 | 3/2002 |

OTHER PUBLICATIONS

Search Report for Corresponding Taiwanese Patent Application No. 095113825; Feb. 11, 2009; 1 page.
PCT Notification of Transmittal of the International Search Report and the Written Opinion of the International Searching Authority, or the Declaration; Jul. 14, 2006; 5 pps.
PCT Written Opinion of the International Searching Authority; Jul. 14, 2006; 5 pps.

* cited by examiner

*Primary Examiner*—Robert W Wilson
(74) *Attorney, Agent, or Firm*—Koppel, Patrick, Heybl & Dawson

(57) ABSTRACT

A data bus and message handling method provide a definitive means of indicating a client-aborted message for data bus systems which employ a message protocol that requires each message conveyed between a client device and an originating device to automatically and atomically include a frame check sequence (FCS). When a message is not to be client-aborted, a 'good' FCS is generated by a first method, typically based on the message's data content. However, when a message is to be client-aborted, the FCS is generated by a second method which requires modifying the good FCS value to create a 'bad' FCS, preferably using a mathematical means that preserves the uniqueness of the bad FCS to a high degree.

20 Claims, 2 Drawing Sheets

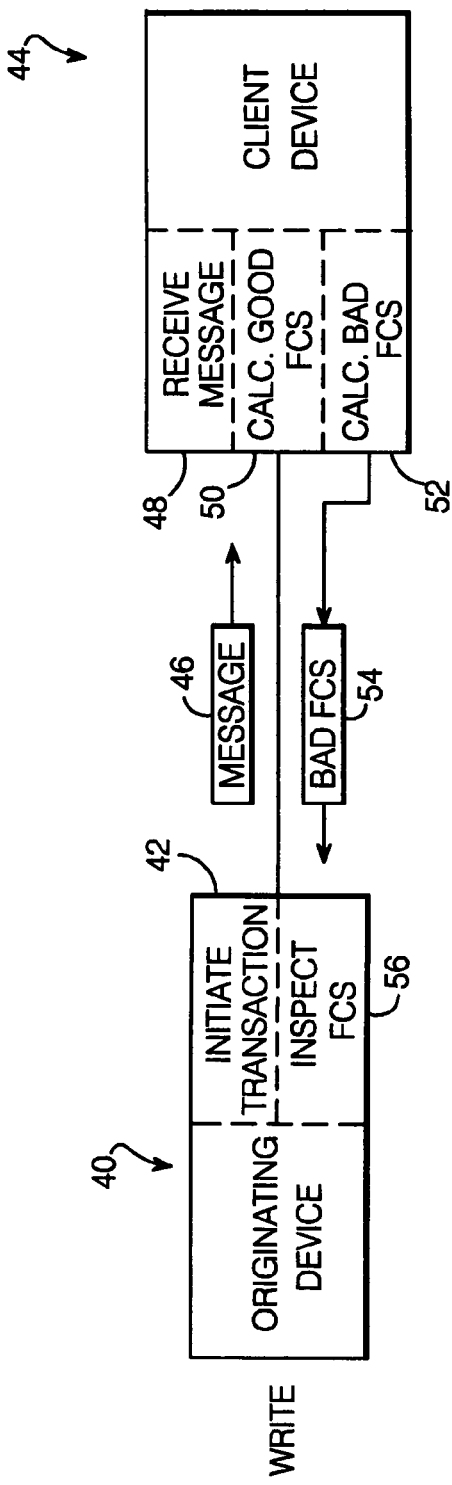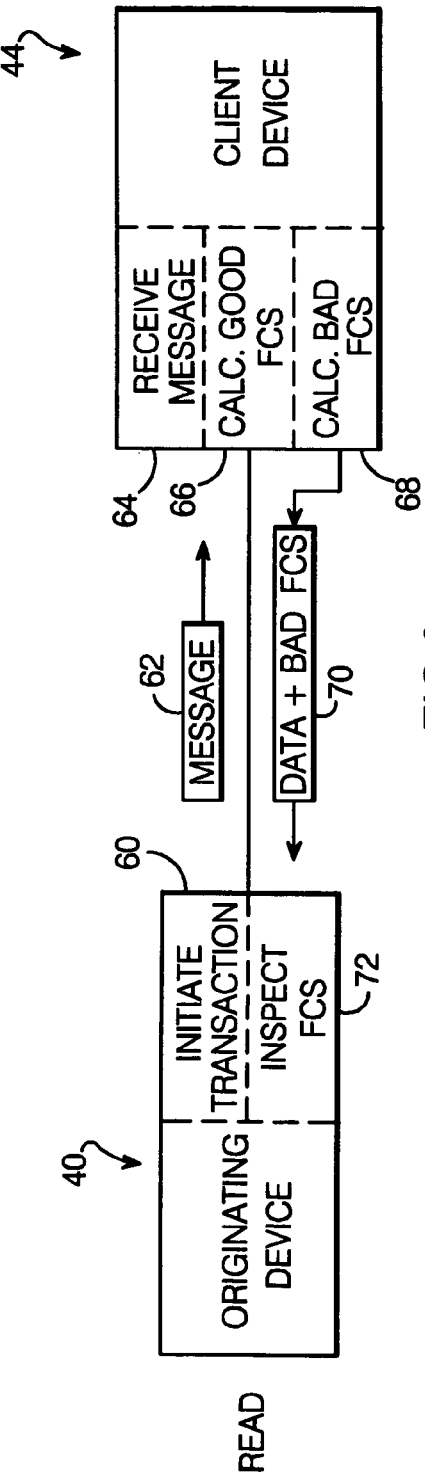

DATA BUS WITH CLIENT-ABORTED MESSAGE HANDLING METHOD

RELATED APPLICATIONS

This application claims the benefit of provisional patent application No. 60/677,292 to Austin et al., filed May 2, 2005.

BACKGROUND OF THE INVENTION

1. Field of the Invention

This invention relates to the field of data busses, and particularly to methods of notifying an originating device that a client device is aborting a bus message.

2. Description of the Related Art

Data busses, found in virtually all computers and computer-based products, are used to convey data between devices connected to the bus. When data is conveyed between an originating device and a "client" device, there exists the possibility that the data will become corrupted en route.

Various schemes have been developed to alleviate this problem. For example, some data bus protocols employ some type of "frame check sequence" (FCS), i.e., one or more data bits that have a value based on the data conveyed, which is included as part of each data message returned by a client device to an originating device. The value of the FCS is calculated in a manner known to both originating and client devices. When a message is received from a client device, an FCS value for the message's data content is calculated by the originating device, and then compared to the received FCS to determine message integrity. One such approach, described in U.S. Pat. No. 6,327,688 to Stolitzka et al., automatically and atomically includes an FCS as part of each message sent by a client device.

A problem arises, however, when a client device needs to notify an originating device that a message needs to be aborted by the client; i.e., "client-aborted". Various methods have been used to indicate a client-aborted message, including responding with a fixed and known FCS value such as all ones or all zeros, leaving the bus high, leaving the bus low, or setting a status register bit. However, responding with a fixed and known FCS value to indicate an abort may be problematic, since there is some likelihood that a message's FCS will be the same as the fixed and known abort value. As such, a 'good' message may be mistaken for an aborted one. Setting a status register bit is also troublesome, as the status register must either be read in another message or added as payload to the present message. Both of these remedies decrease useful bus bandwidth and add unneeded bytes to the existing message.

SUMMARY OF THE INVENTION

A data bus and message handling method are presented which overcome the problems noted above. A definitive means of indicating a client-aborted message is provided, such that the client reliably conveys that a message is not accepted even though the message may be received correctly.

The present invention is for use with data bus systems arranged to convey messages between originating and client devices, and which employ a message protocol that requires each message conveyed between a client device and an originating device to automatically and atomically include a frame check sequence (FCS). When a message is not to be client-aborted, a 'good' FCS is generated by a first method—typically based on the message's preceding bytes—known to both client and originating devices. However, when a message is to be client-aborted, the FCS is generated by a second method known to the client, and possibly known to both client and originating devices, which involves modifying the good FCS value to create an FCS value referred to herein as a 'bad' FCS. Originating devices can be arranged to detect bad FCS values, and to abort the received message in response.

A bad FCS is preferably generated by operating on the good FCS value with a mathematical means. Any mathematical means that preserves the uniqueness of the bad FCS to a high degree could be used. For example, the bad FCS might be generated by performing a ones complement or exclusive OR operation on at least a portion of the good FCS value. When so arranged, the client is assured with high reliability that the value of a purposely aborted FCS is different from that of a 'good' FCS, and that a client-aborted message is indicated clearly and certainly to an originating device without needing any additional message overhead.

Further features and advantages of the invention will be apparent to those skilled in the art from the following detailed description, taken together with the accompanying drawings.

BRIEF DESCRIPTION OF THE DRAWINGS

FIG. 2 is a block diagram of a data bus system per the present invention, as used to convey a write command.

FIG. 3 is a block diagram of a data bus system per the present invention, as used to convey a read command.

DETAILED DESCRIPTION OF THE INVENTION

The present invention provides a means of handling client-aborted messages for data bus systems arranged to convey messages between originating and client devices which employ a message protocol that requires each message conveyed between a client device and an originating device to automatically and atomically include an FCS. The means requires modifying the 'good' FCS value that would have been included with a message, using a means that ensures that the modified FCS clearly and unambiguously indicates a client-aborted message to an originating device, whether the originating device is able to distinguish between an incorrectly transmitted and a 'bad' FCS or not.

Figure 1A:
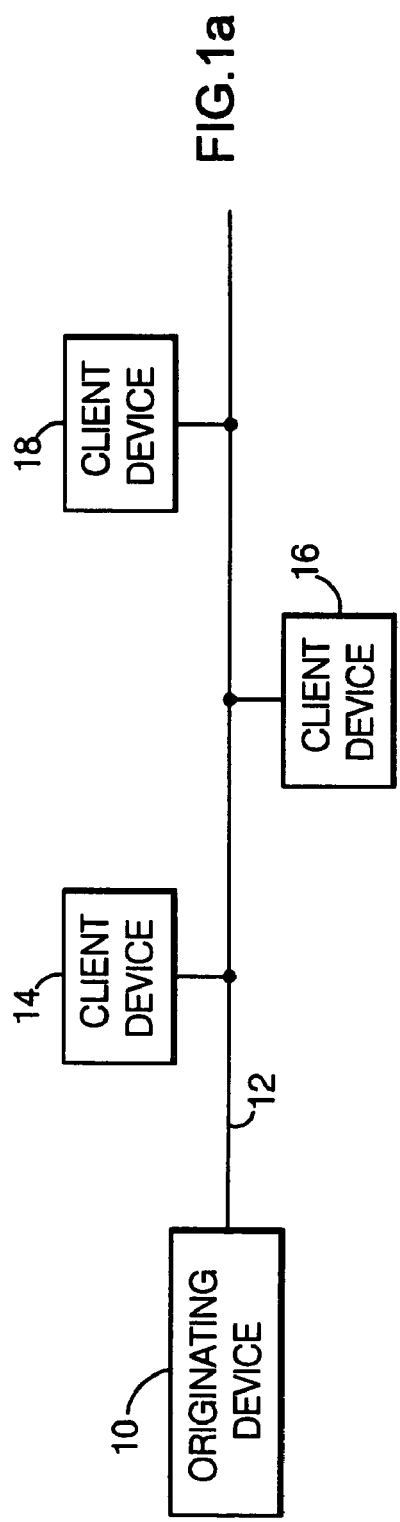
FIG. 1a is a block diagram of a known data bus system.
Figure 1B:
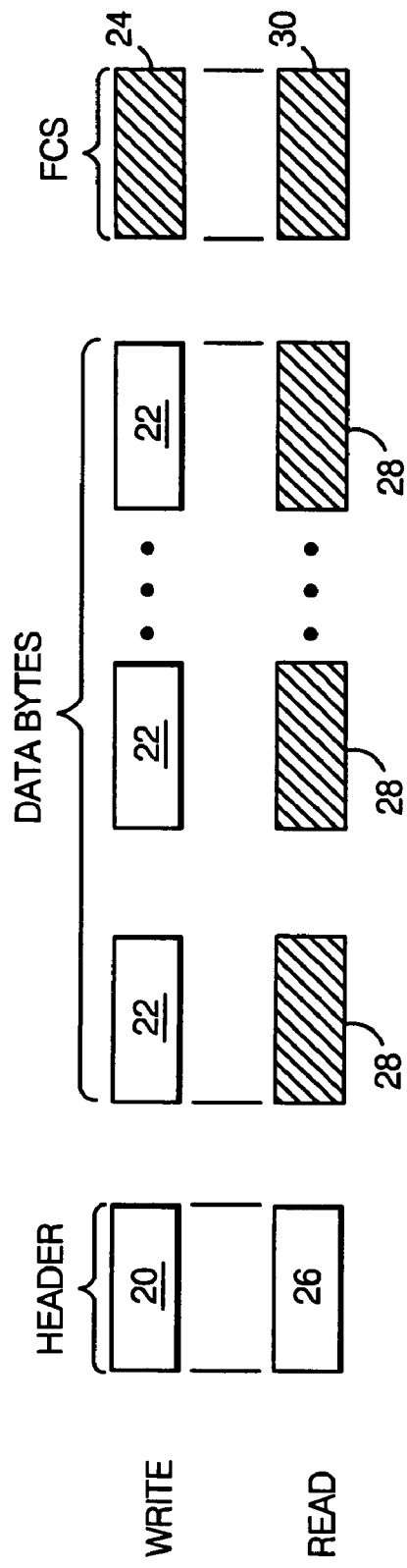
FIG. 1b is a block diagram illustrating the operation of a known data bus system which includes a data integrity verification scheme employing an FCS, as used to perform a write operation and a read operation.

As noted above, the present invention is for use with data bus systems that require messages conveyed between client and originating devices to automatically and atomically include an FCS. Such a system is illustrated in FIGS. 1a and 1b. In FIG. 1a, an originating device 10 is connected to a data bus 12, which is also connected to client devices 14, 16 and 18. Additional or fewer client devices, as well as additional originating devices, could also be connected to bus 12.

Per the present invention, for each bus transaction in which a client device is involved, the client device is arranged to automatically and atomically send an FCS back to the originating device which initiated the bus transaction. A typical implementation of this mechanism is depicted for a 'write' operation and a 'read' operation in FIG. 1b. Messages conveyed between originating and client devices comprise, at a minimum, a message header and an FCS. For a write operation, a message initiated by an originating device includes, at a minimum, a header 20 being written. When received by the targeted client device, the client calculates an FCS value (24) and returns it to the originating device. For a read operation, a message initiated by an originating device includes, at a minimum, a header 26, and the targeted client device responds with the requested data bytes (28) and the client-generated FCS value (30).

The FCS is used to establish the integrity of the conveyed data, and is calculated based on the content of the message's preceding bytes. An FCS as used herein represents the data component of any data integrity scheme, such as a CRC (including 8, 16, and 32 bit versions), a checksum, or a longitudinal redundancy check (LRC); an FCS which is calculated in this manner and sent by a client device to an originating device is referred to herein as a 'good' FCS. The method used to calculate the FCS is known to both the client and originating devices. To ascertain the integrity of data conveyed on the bus, an originating device calculates an FCS value based on the write data sent or the read data received, and compares it with the FCS generated by the client device. FCS values which do not match indicate a failed bus transaction. Details concerning a data bus of this sort can be found, for example, in U.S. Pat. No. 6,327,688 to Stolitzka et al. One specific example of a bus with which the present invention could be suitably employed is a data bus that complies with the Simple Serial Transport™ (SST) specification, for which the FCS is generated using polynomial division based on an 8-bit CRC polynomial known to both originator and client.

When an originator detects that the FCS values match, bus operation proceeds as normal: either the originator continues with the transaction if there is additional 'read' data to obtain, or considers the message correct and completed and proceeds to another operation. When the FCS values do not match, the originator can take various actions, such as abort, discard or re-try the message.

One problem with this scheme, however, is that conventionally, the originating device can only determine that the FCS values do not match and thus the bus transaction failed, but cannot distinguish anything else. For example, a good FCS could have been sent by the client device but received in an altered form due to noise in the wire or media. One or more corrupted bits can fail an FCS byte.

The present invention provides a means of overcoming this problem with respect to client-aborted messages. A client device may need to abort a message for any number of reasons. For example, there could be an internal error discovered within the device, a stack overflow, an incorrect or out-of-date data value still existing in a data buffer, or a higher priority operation that must be completed without delay or processing that would otherwise be given to completing the ongoing transaction. The invention handles messages that have to be aborted by the client device by 'failing' the FCS in a predictable and unique way. Since the method of calculating the good FCS is known by both client and originator, the invention adds a method to modify the good FCS in a unique manner so that client-aborted messages are clearly and unambiguously indicated; a good FCS modified so as to indicate a client-aborted message is referred to herein as a 'bad' FCS. It is preferred, though not essential, that originating devices also know the method used to modify the good FCS, so that it can determine with high certainty that a message has been client-aborted. However, even when originating devices are unaware of the FCS modification method, the value of an FCS so modified will still be recognized as different from that of a good FCS, such that the originator might follow the course of action it would for any incorrect FCS. Since the invention is intended for use with bus systems employing a message protocol that requires an FCS in every message conveyed between a client and an originator, using this invention adds no further overhead to the message and still communicates the meaning of the client-abort to the originator clearly and certainly.

The basic operation of a data bus in accordance with the present invention is shown in FIG. 2 (write operation) and FIG. 3 (read operation). For a write operation, an originating device 40 initiates a bus transaction (42) with a client device 44; at least a portion of the data being written to the client is contained within a message 46. Client device 44 receives the message (48) and calculates the good FCS value (50) using a first method known to both client and originating devices. If client device 44 wants to abort the message, it then calculates the bad FCS value (52) using a second method. As noted above, the second method is preferably, though not necessarily, known to both client and originating devices. The bad FCS value is returned (54) to the originating device, which is arranged to inspect the FCS (56). If the originating device knows the second method, it can detect when a 'bad' FCS is received, and can abort the message accordingly. If the originating device does not know the second method, it will still detect that the value of the received FCS is different from that of a good FCS, and can react accordingly.

For the read operation depicted in FIG. 3, originating device 40 initiates a bus transaction (60) with client device 44; at least a portion of the read request is contained within a message 62. Client device 44 receives the message (64), calculates the good FCS value (66) using the first method, and, if client device 44 wants to abort the message, calculates the bad FCS value (68) using the second method. The bad FCS value is returned (70) to originating device 40 along with the requested data. The originating device inspects the FCS (72): if the originating device is aware of the second method and a bad FCS value is detected, it would typically be arranged to abort the message; otherwise, the originating device would typically be arranged to follow the course of action it would take for any incorrect FCS.

The invention encompasses any method that produces a unique variation on a good FCS to describe a client-aborted message. Preferably, a mathematical means which preserves the uniqueness of the bad FCS to a high degree is used to generate the bad FCS; i.e., the good FCS that would have been sent if the message was not to be aborted is operated on mathematically to produce the bad FCS.

This approach significantly reduces the possibility that an FCS will be misinterpreted. Assume, for example, that a system uses an 8-bit FCS byte, and uses a fixed bit pattern such as 0000 0000 to indicate a client-aborted message. The chances that a good FCS will have this bit pattern, and thus be misinterpreted as a bad FCS, is $1/256$ or ~0.4%.

Using the present method, however, in which a good FCS is modified using a method that produces a unique variation on a good FCS, the possibility of an FCS being misinterpreted is $1/256 \times 1/255$, or ~0.0015%. The unlikely probability of such an error gives the client device certainty that it sends a 'bad' FCS that is not the same as the 'good' FCS, and the originating device additional and reasonable certainty that a particular message has been client-aborted. As previously noted, the originating device may simply be arranged to detect a 'good' FCS and deal with anything that is not a 'good' FCS in an identical way. Alternatively, the originating device may be arranged to take some sort corrective action upon receipt of a specifically 'bad' FCS, such as discarding the received data, or retrying the message after an appropriate time.

Note that the invention is not limited to any particular type of bus. Rather, it is applicable to any data bus system arranged to automatically and atomically include an FCS with each message conveyed between a client device and an originating device to ensure the integrity of the data conveyed.

A data bus system per the present invention is useful with a number of possible message protocols. The discussion above has described the client devices as returning frame check sequences for each bus transaction in which they are involved. In practice, more than one FCS may be returned during a given bus transaction—depending on the length and/or number of messages conveyed. The frequency with which frame check sequences should be returned depends on various factors, such as the desired confidence level in the integrity of the data conveyed, and the bus bandwidth to be allocated to data integrity verification. Examples of message protocols for which the present invention is well-suited are described, for example, in U.S. Pat. No. 6,327,688.

Several examples of ways to generate a bad FCS by operating on a good FCS are listed in Table 1 below. The invention is in no way limited to the methods listed—many other possible schemes might be employed; the end system will determine the best client-aborted FCS method. A method in which many bits are changed and the logic required to make the changes is minimal is preferred. In Table 1, 'G' is the 'good' FCS byte, $g_n$ is the nth bit in G; 'B' is the 'bad' FCS byte, and $b_n$ is the nth bit in B.

TABLE 1

Client-aborted FCS Method Simple Examples

| Method Name | Description | Formula | Good FCS (G) | Client-aborted FCS (B) |
|---|---|---|---|---|
| Ones complement | Logically invert all FCS bits | $b_n = \sim g_n$ | 1010 0011 | 0101 1100 |
| Ones complement (least significant nibble only) | Logically invert the least significant nibble of the FCS | $b_n = \sim g_n$ $n = 0..3$ | 1010 0011 | 1010 1100 |
| Twos complement | Numeric inversion of FCS | $B = -G$ | 0011 0010 | 1100 1110 |
| Barrel shift right by N | Shift bits right and wrap the lsb to the msb (formula and examples use N = 1) | $b_{n-1} = g_n$ and $b_n = g_0$ | 0101 1011 | 1010 1101 |
| Barrel shift left by N | Shift bits left and wrap the msb to the lsb (formula and examples use N = 1) | $b_{n+1} = g_n$ and $b_0 = g_n$ | 0101 1011 | 1011 0110 |
| Lateral exclusive OR with N | Take a known value and XOR with the good FCS value | $b_n = N \char`\^ g_n$ | 0011 0101 | If N = 1010 1010 B = 1001 1111 |
| Lateral exclusive NOR with N | Take a known value and XOR with the good FCS value | $b_n = \sim(N \char`\^ g_n)$ | 0011 0101 | If N = 1010 1010 B = 0110 0000 |
| Simple offset with X | Take a known value and add an offset. *Not recommended as the likelihood of a unique FCS is diminished because there is nothing done with 9$^{th}$ bit carrys from the addition | $B = G + X$ | 1001 1111 1110 0011* | If X = 0100 0011 B = 1110 0010 B = 1 0010 0110* (note that an 8-bit register drops 9$^{th}$ bit) |
| Reverse bits | Take bits and reverse order Not recommended since a byte with symmetry will appear as a good FCS byte | $b_7 = g_0$ $b_6 = g_1$ ... $b_0 = g_7$ | 1001 0101 1000 0001 | 1010 1001 1000 0001** |

While particular embodiments of the invention have been shown and described, numerous variations and alternate embodiments will occur to those skilled in the art. Accordingly, it is intended that the invention be limited only in terms of the appended claims.

We claim:

1. A data bus system arranged to convey messages between originating and client device connected to a data bus and which employs a message protocol that requires each message conveyed between a client device and an originating device to include a frame check sequence (FCS) comprising:

A data bus for conveying message between devices connected to said data bus;

An originating device connected to said data bus and arranged to initiate data bus transactions with other devices connected to said data bus; and At least one client device connected to said data bus and arranged to automatically and atomically include a frame check sequence (FCS) with each message convey between said client device and said originating device;

said data bus system arranged when a message to be conveyed to said originating device is not to be client-aborted, the FCS of said message is generated by a first method known to both client and originating devices, said FCS generated by said first method indicating to said originating device whether said conveyed message is 'good' or 'failed', and when a message to be conveyed to said originating device is to be client-aborted, the FCS of said message is generated by said first method and then modified using a second method, said modified FCS conveyed with said message to said originating device.

2. The system of claim 1, wherein said at least one client device is arranged to modify said FCS which would have been generated by said first method by operating on said FCS with a mathematical means.

3. The system of claim 2, wherein said mathematical means comprises performing a ones complement or a twos complement operation on at least a portion of said FCS which would be generated by said first method.

4. The system of claim 3, wherein said mathematical means comprises performing a ones complement operation on the lower nibble of said FCS which would be generated by said first method.

5. The system of claim 2, wherein said mathematical means comprises performing a barrel shift to the right or to the left by N bits.

6. The system of claim 2, wherein said mathematical means comprises performing a lateral exclusive OR or exclusive NOR with a known value.

7. The system of claim 2, wherein said mathematical means comprises adding an offset to said FCS which would be generated by said first method.

8. The system of claim 2, wherein said mathematical means comprises reversing the order of the bits of said FCS which would be generated by said first method.

9. The system of claim 1, wherein said FCS generated by a first method known to both client and originating devices comprises a cyclical redundancy code (CRC), a checksum, or a longitudinal redundancy check (LRC).

10. The system of claim 9, wherein said FCS which would be generated by said first method comprises a CRC-8 polynomial.

11. The system of claim 1, wherein said second method is known to both client and originating devices, said originating device arranged to detect when a message conveyed between a client device and said originating device includes said modified FCS, and to abort said message when said modified FCS is detected.

12. The system of claim 1, wherein said second method is not known to said originating device, said originating device arranged to detect when a message conveyed between a client device and said originating device includes an FCS different from that which would be generated by said first method.

13. A method of handling client-aborted message for a data bus system arranged to convey message between originating and client device connected to a data bus and which employs a message protocol that requires each message conveyed between a client device and an originating device to include a frame check sequence (FCS) comprising:

Initiating by an originating device, a data bus transaction with a client device arranged to automatically and atomically include a frame check sequence (FCS) within each message conveyed between said client device and said originating device;

Generating said FCS by a first method known to both said client and originating devices when a message conveyed between said client and originating device is not to be client-aborted, said FCS generated by said first method indicating to said originating device whether said conveyed message is 'good' or 'failed'; and Generating said FCS by said first method and then modifying said FCS using a second method when a message conveyed between said client and originating device is to be client-aborted and conveying said modified FCS with said message to said originating device.

14. The method of claim 13, wherein said second method is known to said originating device, further comprising:

detecting, by said originating device, that a message conveyed between said originating and client devices includes said modified FCS; and aborting said message when said modified FCS is detected.

15. The method of claim 13, wherein said second method is not known to said originating device, further comprising:

detecting, by said originating device, that a message conveyed between said originating and client devices includes an FCS different from that which would be generated by said first method.

16. The method of claim 13, wherein said second method comprises operating on said FCS which would have been generated by said first method with a mathematical means.

17. The method of claim 16, wherein said mathematical means comprises performing a ones complement or a twos complement operation on at least a portion of said FCS which would be generated by said first method.

18. The method of claim 17, wherein said mathematical means comprises performing a ones complement operation on the lower nibble of said FCS which would be generated by said first method.

19. The method of claim 16, wherein said mathematical means is selected from a group consisting of:

a barrel shift to the right or to the left by N bits;

a lateral exclusive OR or exclusive NOR with a known value;

adding an offset to said FCS which would be generated by said first method; or reversing the order of the bits of said FCS which would be generated by said first method.

20. The method of claim 13, wherein said FCS generated by a first method known to both client and originating devices comprises a cyclical redundancy code (CRC), a checksum, or a longitudinal redundancy check (LRC).

* * * * *